United States Patent Office 3,589,856
Patented June 29, 1971

3,589,856
POLYMERIZATION OF ETHYLENICALLY UN-SATURATED MATERIALS WITHIN PROTEIN PRODUCTS
Leszek J. Wolfram, Silver Spring, Md., assignor to The Gillette Company, Boston, Mass.
No Drawing. Filed Jan. 11, 1968, Ser. No. 696,981
Int. Cl. D06m 13/02
U.S. Cl. 8—127.5                                                       7 Claims

ABSTRACT OF THE DISCLOSURE

Polymerization of ethylenically unsaturated monomeric material within protein products is facilitated by introducing a mercaptocarboxylic acid into the aqueous polymerization medium containing a water-soluble persulfate initiator at a pH of 1 to 1.4. If tris(hydroxymethyl)phosphine or tetrakis-(hydroxymethyl)phosphonium chloride is also present the pH may range from 1 to 3.

---

This invention relates to the polymerization of ethylenically unsaturated monomeric materials within the interior of protein products and pertains more specifically to carrying out such polymerization in wool fibers in the presence of a mercaptocarboxylic acid which enhances the rate of polymerization.

It has previously been proposed to improve the mechanical characteristics of wool, particularly the lower grades of wool, by polymerizing ethylenically unsaturated monomeric material within the interior of the wool fibers; one effective way of achieving polymerization within the interior of the fibers, as distinguished from polymerization on the exterior surface thereof, has been to carry out the polymerization in the presence of an oxygen scavenger such as tris(hydroxymethyl)phosphine or tetrakis-(hydroxymethyl)phosphonium chloride.

It has now been found that polymerization can also be caused to take place in the interior of protein products in the form of particles, films or fibers, such as wool, as distinguished from the exterior, by carrying out the polymerization in an aqueous medium in contact with the protein using a water-soluble persulfate as the initiator of polymerization at a pH of 1 to 1.4 provided there is present an aliphatic mercaptocarboxylic acid which is soluble in water to the extent of at least 0.01% by weight at 20° C. Furthermore, it has been found that the addition of such a mercaptocarboxylic acid to a polymerization system containing in addition certain phosphorus-containing oxygen scavengers, at a pH from 1 to 3, enhances the rate of polymerization while permitting it to take place primariy within the interlior of the protein product. The mercaptocarboxylic acid should be added to the polymerization system after the initiator and protein have been in contact with each other and after sufficient time has elapsed, at least 15 minutes at 20° to 50° C., for the persulfate initiator to be sorbed to a substantial extent by the protein.

The monomeric materials which may be employed in the present invention include any one or more of the ethylenically unsaturated monomeric materials capable of undergoing additional polymerization in solution or in dispersion in an aqueous medium. Among such monomers are vinyl halides such as vinyl chloride, vinyl esters such as vinyl acetate, vinyl ethers such as vinyl methyl ether, vinyl ketones such as vinyl methyl ketone, styrene, vinylidene chloride, acrylic acid and salts thereof, acrylic esters such as methyl or ethyl acrylate, methacrylic acid and salts thereof, methacrylic esters such as methyl and ethyl methacrylate, acrylonitrile, methacrylonitrile, acrylamide, methacrylamide, maleic esters such as ethyl maleate, methylisopropenyl ketone, styrene, 1,3-butadiene, etc. The proportion of monomeric material to the remainder of the aqueous polymerization system is not critical but may be any conventional proportion, e.g. from 0.1 to 5% by weight of the aqueous system.

The polymerization system may contain in addition to water and the desired monomer or mixture of monomers, any of the usual emulsifying or dispersing agents. The pH of the aqueous system may be adjusted to the desired value of 1 to 3 or 1 to 1.4 as the case may be by the addition of any conventional strong acid such as hydrochloric, nitric, or sulfuric acid. A water soluble persulfate initiator of polymerization must be used such as ammonium, sodium, or potassium persulfate, most of which may be in the form of the free acid in the aqueous system at the operative pH range. Any conventional amount of initiator may be used, from 0.01 to 3.0% by weight of the aqueous polymerization system exclusive of the monomeric material.

The oxygen scavenger which is an ingredient of the polymerization system in one embodiment of the invention may be added either in the form of tris(hydroxymethyl)phosphine and acid salts thereof or as tetrasubstituted phosphonium salts such as tetrakis-(hydroxymethyl)phosphonium salts of any readily available acids, e.g. the acetate or chloride, the latter being particularly preferred. It will be understood that the salts when dissolved in the aqueous system are more or less completely ionized at the operative pH. The concentration of such oxygen scavenger in the aqueous polymerization system may vary from 0.002 to 5.0 molar. No advantage results from using higher concentrations.

The mercaptocarboxylic acid employed must be soluble in water at 20° C. to the extent of at least 0.01% by weight. Among satisfactory acids are thioglycolic acid, thiolactic acid, and thiosalicylic acid. The acids may be introduced into the aqueous polymerization system as such or in the form of a water soluble salt, for example, which dissociates to free acid in the aqueous medium at the operative pH. The concentration of acid may range from 0.002 to 0.2 molar in the aqueous medium.

The protein products with which the process of the present invention is advantageously used include wool, silk, regenerated casein fibers and powders, gelatin film, and the like. The process is of particular value when applied to fibers and films having a maximum gauge of ten mils, and to powders having an average particle diameter which is at most ten mils, the polymer formed amounting to about 10 to 40% by weight of the original weight of the fiber or film or powder. The improvement in wool fibers brought about by the present invention is particularly striking.

The soft, fine, sleazy wools are upgraded by carrying out the polymerization of monomeric materials within the fibers to provide a weight increase from about 10 to 40% based on the original weight of the wool fibers. The process results in substantial improvement in bending stiffness, breaking strength, appearance retention, hydrophobicity, and resistance to soil of the wool, and similar improvements in the properties of other protein fibers and films. Powders such as casein powder when treated in accordance with the present invention may be used as ion exchange materials and exhibit improved thermal stability as compared to untreated casein powder, as well as swellability in non-aqueous media. The inclusion of mercaptocarboxylic acids in the polymerization system in accordance with the present invention makes it possible to achieve the desired weight increase of the protein fibers or films, together with the concomitant improvement in properties in a substantially shorter time than is possible in the absence of the mercaptocarboxylic acids.

There is nothing critical about the temperature of polymerization, best results being obtained at the usual temperatures of 20° to 50° C., preferably from 20° to 40° C. The polymerization may be carried out by padding a fabric, for example, a carpet, or padding raw stock or yarn or film with an aqueous polymerization system containing the persulfate initiator and the scavenger, allowing it to stand at least fifteen minutes at 20° C. to permit the persulfate to be adsorbed by the fiber or film, then bringing the fiber or film into contact with an aqueous solution or dispersion of the mercaptocarboxylic acid, and finally exposing it to the vapors of water and the desired monomeric material or mixture of monomeric materials. The polymerization may also be carried out, more conveniently, by apply the monomeric materials to the fiber or film in the form of an aqueous dispersion, either together with or separately from the mercaptocarboxylic acid, for example by padding. If desired, the fiber or film may be dried after the persulfate-scavenger solution has been applied to it and before the aqueous monomer dispersion and solution of mercaptocarboxylic acid is applied.

The following specific examples are intended to illustrate more clearly the nature of the present invention without acting as a limitation upon its scope.

EXAMPLE 1

Wool top was conditioned at 65% relative humidity at 70° F. A one-gram sample of such wool was stirred into 50 ml. of an aqueous solution containing dilute sulfuric acid (final pH 1.4) and containing 2.5 g. acrylonitrile, and 0.15 g. ammonium persulfate maintained at 25° C. After fifteen minutes there was stirred into the bath 0.15 g. of thioglycolic acid and polymerization was allowed to continue for 60 minutes at 25° C.

The wool was then removed from the solution, rinsed with water, dried, and conditioned at 65% relative humidity at 70° F., whereupon it was found to have gained 35.4% in weight. Only a moderate proportion of monomer polymerized outside of the wool fibers, as indicated by the formation of moderate turbidity in the aqueous polymerization medium. Results were almost as good when the amount of thioglycolic acid was decreased to 0.05 g., the weight gain of the wool in that case being 33.2%.

EXAMPLE 2

The procedure of Example 1 was repeated except that there was present only 0.05 g. of ammonium persulfate, the wool was allowed to remain in contact with the solution for 30 minutes before the thioglycolic acid was added, and only 0.05 g. of thioglycolic acid was present. In this case the gain in weight of the wool was 26.5%, and formation of polymer externally of the wool was only moderate as indicated by the extent of turbidity.

EXAMPLE 3

The procedure of Example 1 was repeated except that 0.01 normal sulfuric acid was present (final pH 2.4) and 0.15 g. tetrakis-(hydroxymethyl)phosphonium chloride was added along with the persulfate and thirty minutes was allowed to elapse before adding the thioglycolic acid. The weight gain of the wool was 29.3%, and in this case little or no polymer formed externally of the fibers, as shown by the fact that the bath exhibited little or no turbidity. The amount of polymer formed was substantially greater than that which was formed under the same conditions in the absence of thioglycolic acid.

EXAMPLE 4

The procedure described in Example 3 was repeated except that there was used, in place of wool, silk fibers, regenerated casein fibers sold under the trade name Fibrolane, and gelatin film (10 mils gauge), and casein powder (average particle size about 5 mils) and except that the thioglycolic acid was added after 15 minutes instead of after thirty minutes.

In each case there was substantial formation of polymer within the protein fiber or film, as shown by the lack of turbidity within the polymerization bath and by the following increases in weight:

| | Percent |
|---|---|
| Silk | 14.7 |
| Regenerated casein fibers | 50.5 |
| Gelatin film | 40.6 |
| Casein powder | 25.3 |

In each case the increase in weight was substantially greater than was obtained under the same conditions in the absence of thioglycolic acid. Similar results were obtained using thiolactic acid or thiosalicylic acid.

EXAMPLE 5

The procedure described in Example 3 was repeated except that the monomeric materials listed below were substituted for acrylonitrile and except that the thioglycolic acid was added after fifteen minutes instead of after thirty minutes. In each case the weight increase of the wool was as given below:

| | Percent |
|---|---|
| Methacrylic acid | 56.7 |
| Methyl acrylate | 32.3 |
| Styrene | 46.1 |

In each case little or no polymerization occurred on the outer surface of the fibers or in the bath on the basis of visual observation.

Although specific embodiments of the invention have been described herein, it is not intended to limit the invention solely thereto but to include all of the variations and modifications which suggest themselves to a person skilled in the art.

What is claimed is:

1. In a method of polymerizing ethylenically unsaturated monomeric material within protein products by maintaining said products in contact with an aqueous medium at a pH from 1 to 3 containing said monomeric material together with a water-soluble persulfate initiator and an oxygen scavenger selected from the class consisting of tris(hydroxymethyl)phosphine and tetrakis-(hydroxymethyl)phosphonium chloride, the step which comprises introducing into said medium after the initiator has been in contact with said products for at least fifteen minutes at 20° to 50° C., a mercaptocarboxylic acid which is soluble in water to the extent of at least 0.01% by weight at 20° C., concentration of said mercaptocarboxylic acid being from 0.002 to 0.2 molar.

2. A method as claimed in claim 1 in which said mercaptocarboxylic acid is selected from the class consisting of thioglycolic acid, thiolactic acid, and thiosalicylic acid.

3. A method as claimed in claim 2 in which said protein is wool.

4. A method as claimed in claim 3 in which said monomeric material is acrylonitrile.

5. A method as claimed in claim 3 in which said monomeric material is methacrylic acid.

6. A method as claimed in claim 3 in which said monomeric material is methyl acrylate.

7. A method as claimed in claim 3 in which said monomeric material is styrene.

References Cited

UNITED STATES PATENTS

| | | | |
|---|---|---|---|
| 3,068,187 | 12/1962 | Bolstad et al. | 8 Graft |
| 3,083,118 | 3/1963 | Bridgeford | 8 Graft |
| 3,291,560 | 12/1966 | Machell et al. | 8—128X |
| 3,457,028 | 7/1969 | Kuhn et al. | 8—128X |
| 3,475,114 | 10/1969 | Bolinger et al. | 8—128X |

GEORGE F. LESMES, Primary Examiner

J. R. MILLER, Assistant Examiner

U.S. Cl. X.R.

8—127.6, 128; 260—8